United States Patent
Günther et al.

(10) Patent No.: US 11,858,557 B2
(45) Date of Patent: Jan. 2, 2024

(54) SUPPORT STRUCTURE FOR AN INSTRUMENT PANEL SUPPORT AND INSTRUMENT PANEL SUPPORT HAVING SUCH A SUPPORT STRUCTURE

(71) Applicant: Kirchhoff Automotive Deutschland GmbH, Attendorn (DE)

(72) Inventors: Alexander Günther, Olpe (DE); Phil Grüssing, Finnentrop (DE); Dominik Tentscher, Hemer (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 0 days.

(21) Appl. No.: 18/044,348

(22) PCT Filed: Sep. 30, 2021

(86) PCT No.: PCT/EP2021/076982
§ 371 (c)(1),
(2) Date: Mar. 7, 2023

(87) PCT Pub. No.: WO2022/069655
PCT Pub. Date: Apr. 7, 2022

(65) Prior Publication Data
US 2023/0303187 A1 Sep. 28, 2023

(30) Foreign Application Priority Data
Oct. 2, 2020 (DE) .................... 10 2020 125 791.0

(51) Int. Cl.
*B62D 25/14* (2006.01)
(52) U.S. Cl.
CPC .......... *B62D 25/14* (2013.01); *B60K 2370/87* (2019.05)

(58) Field of Classification Search
CPC ... B62D 25/14; B62D 29/004; B60K 2370/87
(Continued)

(56) References Cited

U.S. PATENT DOCUMENTS

| 4,717,195 | A | * | 1/1988 | Okuyama | B62D 25/14 296/72 |
| 5,951,087 | A | * | 9/1999 | Bittinger | B62D 25/14 296/72 |

(Continued)

FOREIGN PATENT DOCUMENTS

| CN | 101659281 A | * | 3/2010 | ........ B62D 25/145 |
| DE | 29916467 U1 | | 12/1999 | |

(Continued)

OTHER PUBLICATIONS

Pending U.S. Appl. No. 17/915,057, filed Sep. 27, 2022, inventors Günther et al., applicant Kirchhoff Automotive Deutschland GmbH.

(Continued)

*Primary Examiner* — Pinel E Romain
(74) *Attorney, Agent, or Firm* — Polson Intellectual Property Law, PC; Margaret Polson; Christopher Sylvain

(57) ABSTRACT

A support structure for a motor vehicle instrument panel support having a support part, which follows the longitudinal extension of the instrument panel support, and a metal connector for connecting the support part to another structure. The support part is made of a different material than the metal connector. The metal connector has a multi-part construction including a base part and a bracket part. The base part has a support part connection surface supported on the lateral surface of the support part. The bracket part encloses the support part opposite to the support part connection surface to provide a support part enclosure together with the support part connection surface of the base part. The metal connector is connected in a materially bonded manner to the support part in the area of its support part enclosure.

(Continued)

The bracket part is connected to the base part via a joining process using heat.

20 Claims, 7 Drawing Sheets

(58) Field of Classification Search
USPC .............................. 296/72, 24.34; 248/205.1
See application file for complete search history.

(56) References Cited

U.S. PATENT DOCUMENTS

| | | | | |
|---|---|---|---|---|
| 6,129,406 | A * | 10/2000 | Dauvergne | B60K 37/00 |
| | | | | 296/70 |
| 8,388,048 | B2 * | 3/2013 | Usuda | B62D 25/082 |
| | | | | 296/72 |
| 8,950,794 | B2 | 2/2015 | Lenkenhoff | |
| 9,446,799 | B2 | 9/2016 | Franzpötter | |
| 9,598,100 | B2 | 3/2017 | Enkenhoff | |
| 9,764,764 | B2 | 9/2017 | Irle | |
| 10,005,495 | B2 | 6/2018 | Töller | |
| 10,577,025 | B2 | 3/2020 | Michler | |
| 10,882,559 | B2 | 1/2021 | Gündogan | |
| 11,001,303 | B2 * | 5/2021 | Kong | B60K 37/00 |
| 11,142,248 | B2 | 10/2021 | Günther | |
| 11,148,623 | B2 | 10/2021 | Günther | |
| 11,235,720 | B2 | 2/2022 | Höning | |
| 11,292,409 | B2 | 4/2022 | Töller | |
| 11,505,146 | B2 | 11/2022 | Weige | |
| 2007/0210616 | A1 * | 9/2007 | Wenzel | B62D 25/142 |
| | | | | 296/187.03 |
| 2010/0072784 | A1 * | 3/2010 | Malek | B62D 29/004 |
| | | | | 296/193.01 |
| 2016/0052562 | A1 * | 2/2016 | Yoshida | B62D 25/14 |
| | | | | 296/72 |
| 2019/0344385 | A1 | 11/2019 | Töller | |
| 2020/0122778 | A1 | 4/2020 | Werneke | |
| 2022/0009435 | A1 | 1/2022 | Günther | |
| 2022/0024399 | A1 | 1/2022 | Tlauka | |
| 2022/0119042 | A1 * | 4/2022 | Zhang | B62D 25/145 |
| 2022/0258684 | A1 | 8/2022 | Günther | |
| 2022/0281532 | A1 | 9/2022 | Tentscher | |
| 2022/0289304 | A1 | 9/2022 | Weige | |
| 2022/0297524 | A1 | 9/2022 | Günther | |
| 2022/0314912 | A1 | 10/2022 | Töller | |
| 2022/0363211 | A1 | 11/2022 | Günther | |
| 2023/0039843 | A1 | 2/2023 | Gündogan | |

FOREIGN PATENT DOCUMENTS

| | | | | |
|---|---|---|---|---|
| DE | 102008045914 | A1 | 3/2010 | |
| DE | 102011101581 | A1 | 11/2012 | |
| DE | 102012016268 | A1 | 2/2014 | |
| FR | 2971759 | A1 * | 8/2012 | B62D 1/16 |
| WO | 2008034522 | A1 | 3/2008 | |

OTHER PUBLICATIONS

Pending U.S. Appl. No. 17/914,465, filed Sep. 26, 2022, inventors Günther et al., applicant Kirchhoff Automotive Deutschland GmbH.
Pending U.S. Appl. No. 17/912,589, filed Sep. 19, 2022, inventor Lagin, applicant Kirchhoff Automotive Deutschland GmbH.
Pending U.S. Appl. No. 18/008,284, filed Dec. 5, 2022, inventors Günther et al., applicant Kirchhoff Automotive Deutschland GmbH.
International Search Report dated Feb. 1, 2022 in parent international application PCT/EP2021/076982.
Written Opinion of the International Searching Authority dated Feb. 1, 2022 in parent international application PCT/EP2021/076982.

* cited by examiner

SUPPORT STRUCTURE FOR AN INSTRUMENT PANEL SUPPORT AND INSTRUMENT PANEL SUPPORT HAVING SUCH A SUPPORT STRUCTURE

BACKGROUND

The subject matter of the present disclosure is a support structure for an instrument panel support for a motor vehicle having at least one support part following the longitudinal extension of the instrument panel support and having at least one metal connector connected thereto for connecting the support part to a further support part or for connecting a strut or bracket to the support part. An instrument panel support having such a support structure is also described. An instrument panel support may also be referred to as a dashboard support.

Instrument panel supports are used to attach instruments and the steering column in a vehicle. Such an instrument panel support is installed between two pillars, specifically the A-pillars of a motor vehicle. For connection to the A-pillars, the instrument panel support has appropriate mechanical connecting parts at both ends. A key component of such an instrument panel support is a support structure. This extends between the pillars of the body of the vehicle. Connections for instruments and other fixing points relative to the vehicle can be provided on the support structure, such as floor supports, by which the support structure is supported by the floor of the vehicle, for example in the area of a tunnel.

The support structure can, but does not have to, be designed as straight. Such a support structure is often structured so that parts of it extend offset relative to one another with respect to their longitudinal extension. Such support structures are typically tubular bodies, which can certainly also be composed of two or more shells. In addition to support structures that are made from a continuous support tube body, support structures are also used in which the support structure has multiple support parts that follow the longitudinal extension. Depending on the design of the desired support structure, these support parts are arranged in axial alignment with one another or offset with respect to one another with respect to their longitudinal extension. In the first case, a connecting sleeve is usually used to connect the two support parts. In a staggered arrangement, a connector, in many cases a metal connector, is used to connect the two support parts. Then the metal connector bridges the offset between two adjacent support parts. Such support structures can, for example, have a section in the area of the middle which is set back in relation to the two outer support parts in order to create space for the installation of a unit of the vehicle, for example the air conditioning system. The support structure is then guided around this unit.

In many cases, such a support structure is produced from one material, so that the individual components—support parts and connectors—can be connected to one another by welding in a materially bonded manner. The support parts and connectors are typically made of a suitable steel or an aluminum alloy suitable for this purpose. Different requirements are placed on the support structure of such an instrument panel support over its longitudinal extension. For example, the support structure has to be able to absorb higher forces in the area where the steering column is connected than in the front passenger area. Against this background, support structures of instrument panel supports are also composed of support parts made of different materials to reduce weight. In the area of the section of the connection of the steering column, the support part in such a hybrid support structure is produced from steel due to the higher load capacity, while the support part that extends over the front passenger side is manufactured from aluminum, for example, and is therefore made of a different material than the other support part. Instead of another metal, such as aluminum, another material, for example a support part made of fiber-reinforced plastic, can also be provided. In the case of hybrid support structures, the connection of the two support parts that are made of different materials is problematic, which support parts can certainly also be arranged offset to one another in the transverse direction to their longitudinal extension in the region of their connection. The joining of metals of different materials, such as steel and aluminum, is complex and expensive. In addition, the strength requirements placed on the joint generally cannot be met. The use of fasteners to connect two support parts made of different materials impairs the strength requirements in the area of the connection, so that the support parts to be connected accordingly have to be designed to be more stable at these points. This also applies if two support parts are to be connected to one another by an interposed connector.

A support structure of an instrument panel support, in which two support parts are connected to one another with a metal connector interposed, is known, for example, from DE 10 2008 045 914 A1. This metal connector is constructed from two half-shells, which are arranged with their opening side facing toward each other, in order in this way to provide a hollow chamber profile in the section connecting the support parts. Each half-shell provides an end stop for a support part. The two support parts are arranged in the area of the metal connector overlapping one another in the direction of their longitudinal extension. The two shells of the metal connector are connected to one another in a materially bonded manner. The same applies to the connection of the metal connector to the two support parts to be connected thereto. The connection concept known from this prior art is therefore not suitable for connecting two support parts made of different materials to one another.

An instrument panel support is known from DE 10 2011 101 581 A1, in which two support parts made of different materials are connected to one another by a connecting socket connecting the two support parts in the axial direction. One support part is connected to the connecting socket in a materially bonded manner, while the other support part is connected to the connecting socket in a friction-locked manner. Using such a connection socket, however, support parts that are made of different materials and are arranged offset to one another in the region of their connection cannot be connected to one another.

Another connection arrangement for connecting two support parts of an instrument panel support is known from DE 10 2012 016 268 A1, in which the two support parts are also arranged axially aligned with one another. The two support parts are made of different materials. In the connecting area, a connecting element is connected to each support part in a materially bonded manner. To actually connect the two components, the connection elements are mechanically connected to one another. A connection of support parts arranged offset to one another in the connection area is also not possible using this previously known connection arrangement.

SUMMARY

Proceeding from this background, one aspect of the present disclosure is based on proposing a support structure for an instrument panel support, using which support parts of different materials, which are arranged offset from one another in the transverse direction to their longitudinal extension, can also be connected to one another with very simple means while meeting the strength requirements.

This is achieved by a support structure of the type mentioned at the beginning, wherein the at least one support part is made of a different material than that of the metal connector, wherein the metal connector is constructed in several parts and comprises a base part having a support part connection surface supported on the lateral surface of the support part and a bracket part enclosing the support part opposite to the support part connection surface for providing a support part enclosure together with the support part connection surface of the base part, wherein the metal connector in the area of its support part enclosure is materially bonded to the support part by an adhesive bond and the bracket part is connected to the base part as a result of a joining process carried out with the supply of heat.

In this support structure, the metal connector is made of a different material than the at least one support part. The metal connector has a base part so that the distance is bridged between the two support parts to be connected. The base part can be in one piece or composed of two or more parts. In addition to the base part, the metal connector comprises at least one bracket part. The base part provides a support part connection surface. The bracket part completes the support part connection surface to form a support part enclosure, into which the support part to be connected thereon engages, typically with its end section. A special feature of this support structure of an instrument panel support is that the metal connector in the area of its support part enclosure is materially bonded to the support part engaging therein by an adhesive bond. The base part and the bracket part of the metal connector are metal parts that can be joined to one another with the supply of heat. Typically, the two parts of the metal connector are connected to one another by welding, such as spot welding. The one or more welds joining the bracket part to the base part are located adjacent the support part connection surface. This concept of fastening the metal connector to a support part that is made of a different material has synergetic effects if, as is preferably provided, immediately after the assembly of the parts, during which assembly the support part is in the support part enclosure and a curable adhesive is located between its lateral surface and the inner wall of the support part enclosure, the joint connection between the bracket part and the base part of the metal connector, which is carried out with the supply of heat, is created immediately. The heat introduced into this section of the metal connector by this joining process accelerates the curing process of the adhesive. The good heat-conducting properties of the metal connector or of its base part and its bracket part are utilized here. In addition, a certain warping of the base part with its support part connection surface and the bracket part in relation to one another, which is sometimes to be accepted, due to the supply of heat has a positive effect on the desired connection, as a result of which the section of the support part engaging in the support part enclosure is tensioned as a result of the warping caused by the joining process. If a certain adhesive gap is left between the outer lateral surface of the support part and the inside of the bracket part and the support part connection surface, which is the subject matter of a preferred embodiment, suitable measures are typically taken so that such tensioning is possible even with slight warping. This can be achieved, for example, by providing protruding embos sings on the inside of the bracket part in the direction toward the support part enclosure, which embossings are supported on the lateral surface of the support part and in this way allow an adhesive gap to be maintained despite the support. The same applies to the support part connection surface. Additionally or also alternatively to such a measure, an adhesive can also be used which contains globular, preferably spherical solid particles whose diameter corresponds to the gap dimension of the desired adhesive gap. In this respect, the supply of heat for the materially bonded connection of the bracket part and the base part has a positive effect on the connection of the support part. Such a connection of a metal connector to a support part of an instrument panel support may not only be created in a particularly simple manner. Rather, after the adhesive has cured, such a connection also meets the load requirements placed on the support structure of an instrument panel support. It is particularly advantageous that with this connection system the material of the support part can be freely selected without having to take into consideration the implementation of a materially bonded connection, which is otherwise required. This connection of the support part to the metal connector also has a positive effect on the vibration behavior of the support structure. The adhesive layer causes a certain vibration damping.

In one embodiment of such a support structure, the metal connector is used to connect two support parts that are arranged offset relative to another in the transverse direction to their longitudinal extension. The offset of the two support parts relative to one another can be provided in overlapping or also nonoverlapping form. At least one of the two support parts is made of a different material than the metal part. If the other support part is made of the same material as the metal connector, this connection can be performed by welding. According to another embodiment, the metal connector is part of a structure connected to a support part of the support structure, for example a bracket or a strut, such as a tunnel strut. Thus, if the support part is made of a ferrous metal, the metal connector or metal connectors connected thereto can be produced as parts of structural elements made of a light metal, for example an aluminum alloy, or vice versa. This makes it possible to achieve a weight reduction in the design of the instrument panel support. The separation of the lateral surface of the support part from the metallic components of the metal connector by the adhesive layer in its section engaging in the support part enclosure causes at the same time a galvanic separation, due to which contact corrosion between these parts is avoided.

The support part connection surface of the base part is preferably adapted to the contour of the lateral surface of the section of the support part that extends into the support part enclosure. In the case of a support part having a curved lateral surface, for example a cylindrical lateral surface, the support part connection surface of the base part is curved accordingly, wherein the curvature of the support part connection surface is preferably designed having a slightly larger radius so that an adhesive gap remains between the two parts. This does not need to be dimensioned particularly large. An adhesive gap of a few tenths of a millimeter is sufficient. The measures already described above can be used to maintain the adhesive gap during assembly.

The bracket part is typically designed as U-shaped or comprises such a section and is connected with its legs to the base part by the above-described materially bonded joining process. Depending on the design of the base part, the ends of the parallel legs can be used for this connection. In another embodiment, the end sections of the legs of the base part are angled outwards, so that the bracket part has a hat-shaped geometry in the side view. While in the first case the bracket part is connected with its legs to two opposite side walls of the base part, in the second case the joining surfaces of the base part are located adjacent to the support part connection surface.

The bracket part can hold the section of the support part that engages in the support part enclosure in a form-fitting manner in the direction of its longitudinal extension if two support parts that are offset relative to one another with respect to their longitudinal extension in the transverse direction are to be connected using the metal connector. This can be achieved in that a bracket part leg opening is arranged in the lateral surface of the support part in the area of at least one of the two legs of the bracket part. It is also possible that the support part has at least one leg passage, which is formed by two passages in the lateral surface of the support part which are aligned with one another in the direction toward the base part. In such an embodiment, a leg passes through the two passages, so that it is guided out of the support part again on the lower side and thus adjacent to the support part connection surface of the base part. This also allows the use of a U-shaped bracket part having a certain span width for connecting a support part whose diameter exceeds the span width of the bracket part. At the same time, these measures cause a twist lock of the section of the support part that engages in the support part enclosure. This can also be achieved in a support part having a circular lateral surface if the section engaging in the support part enclosure is embossed so that the radius of the rounding is increased on at least one side, which a leg of the bracket part abuts, in particular the embossing is designed in such a way that the leg of the bracket part just abuts it. This can be done by indenting the support part, which is designed as a tube. This can also be achieved when the metal connector is connected to a support part which does not engage in the support part enclosure with its end section, but rather the metal connector is connected to the support part at any point. These measures simplify the fixing of the parts to be connected to one another during the curing process of the adhesive. Even after the adhesive has cured, the shear stress on the adhesive layer is reduced by these measures.

The metal connector can be composed of two shell components. These typically have a U-shaped cross-sectional profile, wherein the opening side of these shells faces away from one another. According to one particular embodiment of such a metal connector, the two shells are designed as mirror-symmetrical with respect to the joining plane of the two shells with one another, at least in relation to the base part and the bracket part. While one section of one half-shell of such a metal connector forms the base part and the support part connection surface is formed thereon, the latter represents the bracket part in the other shell. If both shells are constructed in the same way, the base part of the first half-shell is supplemented by the mirror-symmetrical section of the other shell part. In such a metal connector, the two shells are joined together in the described manner using the supply of heat in a materially bonded manner at the contact areas located directly adjacent to the support part connection surface.

The parts of the metal connector can be stamped and bent parts or formed from a plate. It is also possible, for example, to provide the base part as a section of an extruded profile.

In the same way as described above, the metal connector can also be connected to the second support part if the latter is made of a different material than the metal connector. If the second support part is made of the same material as the metal connector, both parts can be connected to one another by welding in a materially bonded manner. Depending on the type of connection of the metal connector to the second support part, the base part is designed accordingly. If a joined connection of the metal connector to the second support part is provided, the metal connector can have a fork-shaped receptacle into which a section of the second support part protrudes, so that the two parts can then be welded to one another. The width of the fork is generally chosen to be somewhat smaller than the diameter of the support part to be connected thereon. It is also entirely possible to design the connection of the second support part of the same material to the metal connector in such a way that the base part provides a front-side connection surface which the second support part abuts on the front side and is welded to the base part.

For the connection of the individual support parts of the support structure, the desired offset of the support parts can be provided with or without overlapping. The metal connector is correspondingly adapted to the intended design of the support parts relative to one another. Therefore, when designing such a support structure having this connector system, one is not dependent on one or the other arrangement of the offset support parts, i.e., with or without overlapping.

A further advantage of the support structure described is that the base part can certainly be part of a structural component which also serves other purposes or can be used for such purposes. The reason for this is that the support part connection surface of the base part does not necessarily have to be positioned at one end of the base part. Therefore, the metal connector can certainly be the extension of a floor support, for example, with which the support structure is supported on the vehicle floor when the instrument panel support is installed in a vehicle. Such a component can also be used for the purpose of supporting certain units.

BRIEF DESCRIPTION OF THE DRAWINGS

The present disclosure is described hereinafter in the context of exemplary embodiments with reference to the attached figures, wherein.

DETAILED DESCRIPTION

Figure 1:
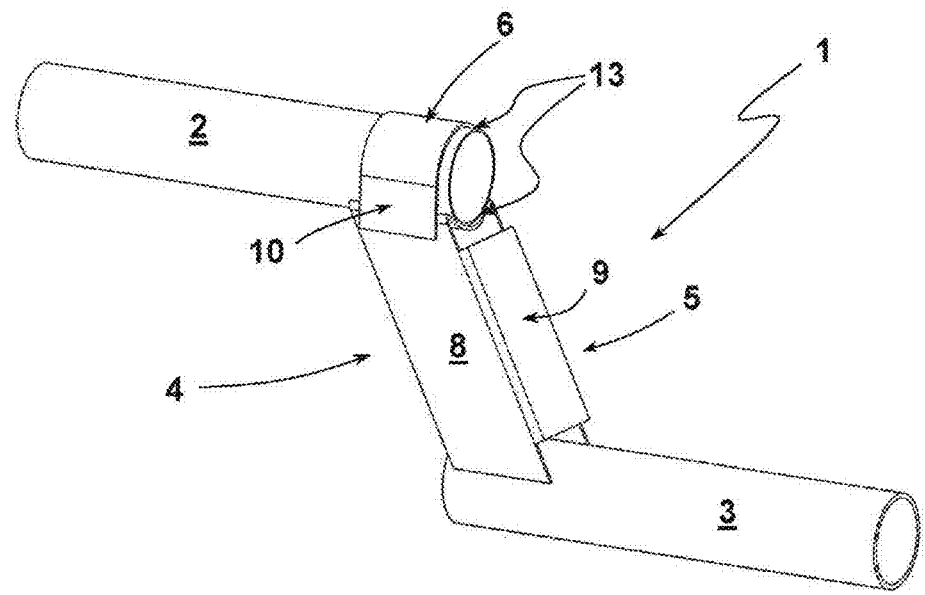
FIG. 1 shows a schematic representation of a detail of a support structure for an instrument panel support of a motor vehicle, in which detail two support parts are connected by a metal connector.
Figure 2:
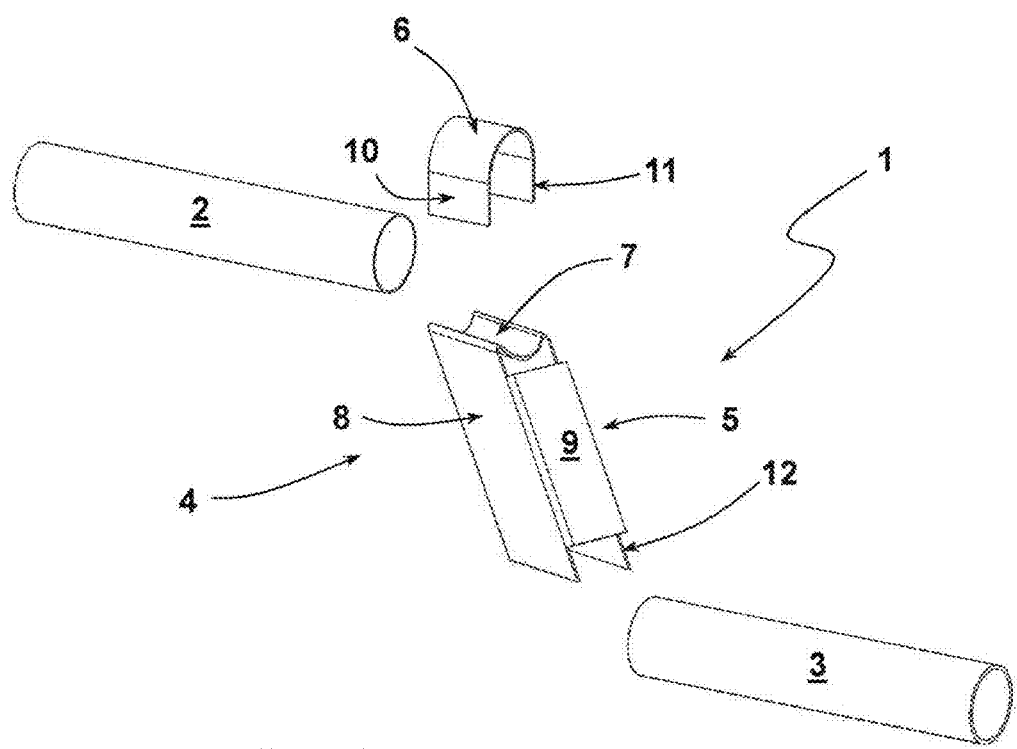
FIG. 2 shows the detail of the support structure of FIG. 1 in an exploded view.

FIG. 1 shows a detail of a support structure 1 for an instrument panel support of a motor vehicle. In the detail shown, the support structure 1 comprises two support parts 2, 3 arranged offset to one another. The subject matter of this embodiment concerns the connection of these two support parts 2, 3, which is why only a detail of the entire support structure is shown for this embodiment and also for the other embodiments in which the support parts are arranged offset to one another. In the embodiment of FIGS. 1 and 2, the support part 3 is manufactured from steel, while the support part 2 is produced from an aluminum alloy. The two support parts 2, 3 are offset in the direction of their longitudinal extension at least in the area of their connection to one another. The offset of the two support parts 2, 3 is transverse to their longitudinal extension. The two support parts 2, 3 are connected by a metal connector 4. The metal connector 4 in the illustrated embodiment consists of a base part 5, produced as a stamped and bent part from a steel plate, and a bracket part 6. The U-shaped bracket part 6 is also produced from a steel plate. In the embodiment shown in FIG. 1, the end sections of the support parts 2, 3, which are connected to one another via the metal connector 4, are arranged with no or only a slight overlap with one another.

On its side facing toward the support part 2, the base part 5 has a curved support part connection surface 7. The curvature of the support part connection surface 7 essentially corresponds to the curvature of the outer lateral surface of the support part 2, in such a way that in the arrangement shown in FIG. 1 a small gap remains to accommodate adhesive. In the embodiment shown, the base part 5 produced from a steel plate is designed to be closed in its middle section, as can be seen from the closing plate 9 angled from the leg 8. This part can also be designed to be open on one side. The rear side of the base part 5 of the metal connector 4, which cannot be seen in FIGS. 1 and 2, has the same design. The U-shaped bracket part 6, whose two legs 10, 11 abut on the outside of the opposite outer sides of the legs 8, 12 of the base part 5, is welded to the base part 5 with the ends of its legs 8, 12. The bracket part 6 forms, with the support part connection surface 7, a support part enclosure. The end section of the support part 2 engages in the support part enclosure. A special feature is that the outer lateral surface of the support part 2 is held therein with the interposition of an adhesive layer 13 that can be cured in an accelerated manner when heat is supplied. The support structure 1 is mounted in the detail shown in FIGS. 1 and 2 by placing the end of the support part 2, which is peripherally coated with adhesive, on the support part receptacle surface 7 of the base part 5, and then the bracket 5 is placed on the support part 2 over the side opposite to the support part connection surface 7 to complete the support part enclosure. The two legs 10, 11 of the bracket part 6 then abut the outside of the legs 8, 12 and are welded thereto. This welding process takes place immediately after the parts are positioned relative to one another and the adhesive has not yet cured. The heat supply caused by the welding promotes rapid curing of the adhesive. In addition, a certain warping is used by the welding process, due to which the end section of the support part 2 protruding into the support part enclosure is additionally tensioned therein. The result is a friction-locked and materially bonded connection between the support part 2 and the metal connector 4, which withstands high loads.

Since, in the illustrated embodiment, the metal connector 4 is made of the same material as the second support part 3, these two parts 3, 5 are connected to one another by a welded bond. The weld seam is carried out along the lower ends of the legs 8, 12 in the transition to the lateral surface of the support part 3.

Figure 3:
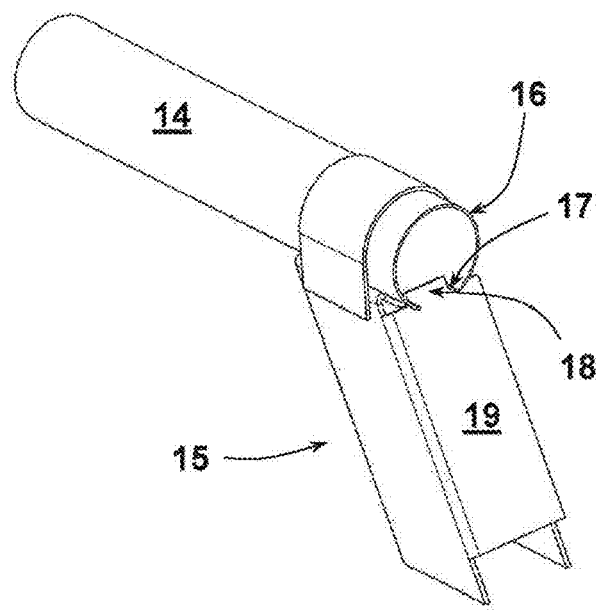
FIG. 3 shows an alternative embodiment of a connection of a metal connector to a support part of a support structure according to FIG. 1.

FIG. 3 shows a further support part 14 which, like the support part 2 of the embodiment in FIGS. 1 and 2, is produced from an aluminum alloy. The metal connector 15 is connected to the support part 14 in the same way as described for the embodiment of FIGS. 1 and 2. The embodiment of FIG. 3 differs from that of FIGS. 1 and 2 in that the support part 14 has an opening 17 in its end face 16, into which a tab 18 of the closing plate 19 of the base part 15 engages. The tab 18 provides an end stop for the support part 14 as well as a twist-lock device, so that the support part 14 cannot be rotated around its longitudinal axis in relation to the metal connector 15 during the curing process.

Figure 4:
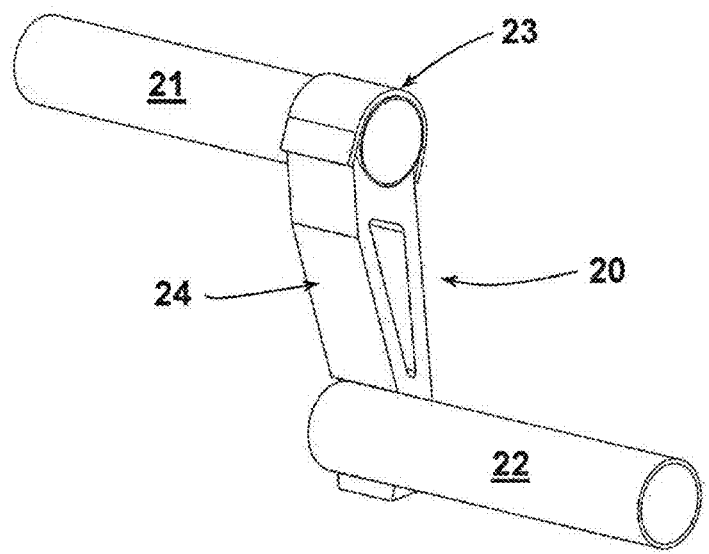
FIG. 4 shows another embodiment of a support structure having a metal connector for connecting two support parts for an instrument panel support.

In the embodiment shown in FIG. 4, the metal connector 20 for connecting two support parts 21, 22 as part of a support structure for an instrument panel carrier is a section of an aluminum extruded profile. In this embodiment, one support part 21, which engages with its end section in the support part enclosure, is a steel component, while the other support part 22 is produced from an aluminum alloy. The bracket part 23 of this embodiment is also manufactured from an aluminum alloy. Therefore, the bracket part 23 can be welded to the base part 24 of the metal connector 20, and the base part 24 can be welded to the second support part 22.

Figure 5:
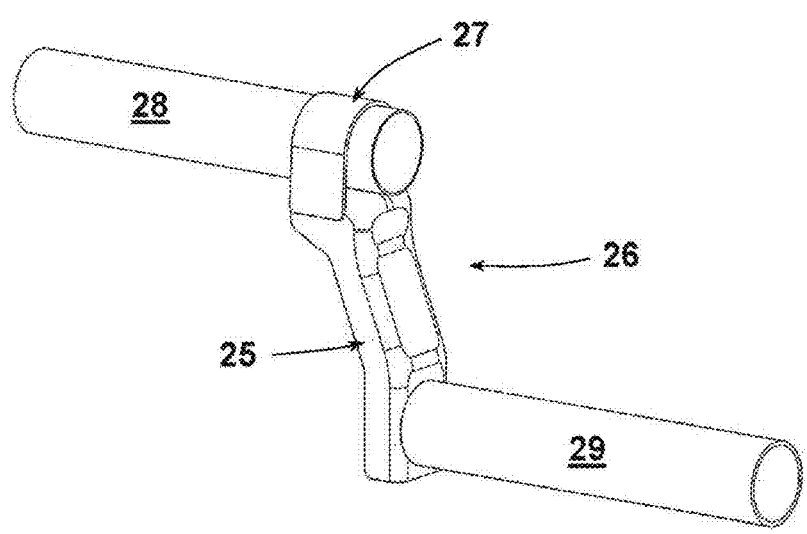
FIG. 5 shows still another embodiment of a metal connector for connecting two support parts of a support structure for an instrument panel support.

FIG. 5 shows still another embodiment, in which the base part 25 of the metal connector 26 is produced from a steel plate in the manner of a shell. In this embodiment, the bracket part 27 is also produced from a steel plate. The support part 28 engaging with its end section in the support part enclosure is manufactured from an aluminum alloy, while the other support part 29 is made of the same material as the base part 25 of the metal connector 26. In this embodiment, the support part 29 is welded to a corresponding contact surface of the base part 25 of the metal connector 26 at the end face.

Figure 6:
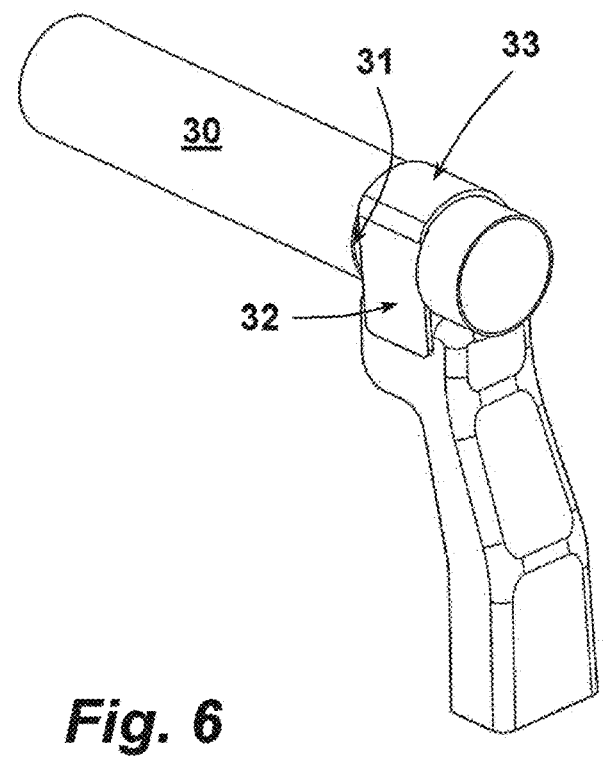
FIG. 6 shows still another embodiment of a metal connector for connecting two support parts of a support structure for an instrument panel support.
Figure 7:
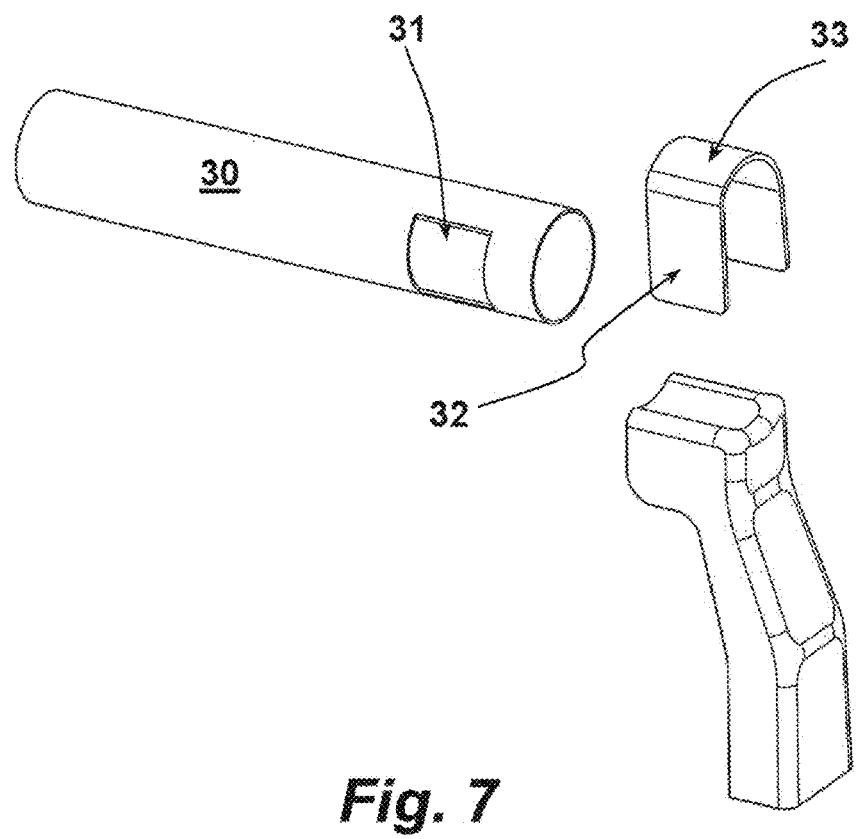
FIG. 7 shows the support structure detail of FIG. 6 in an exploded view.

FIG. 6 shows an embodiment of a support structure as explained for FIG. 5, but with an axial lock with respect to the support part 30 engaging in the support part receptacle. As better seen from the exploded illustration in FIG. 7, the support part 30 has a bracket part leg opening 31 into which a leg 32 of the bracket part 33 engages so that the lower section of the leg 32 and also the parallel leg in turn come into contact on the outer wall of the base part in order to be joined thereto. The second support part 29 is not shown in the embodiment of FIGS. 6 and 7. At the same time, this measure provides a twist lock. In a further embodiment, not shown in the figures, it is provided that a cutout is introduced into the apex side of the support part facing away from the support part connection surface in its section with which it engages in the support part enclosure, into which an embossing introduced in the apex area of a bracket part engages. This measure also provides a form fit in the longitudinal direction and a twist lock.

Figure 8:
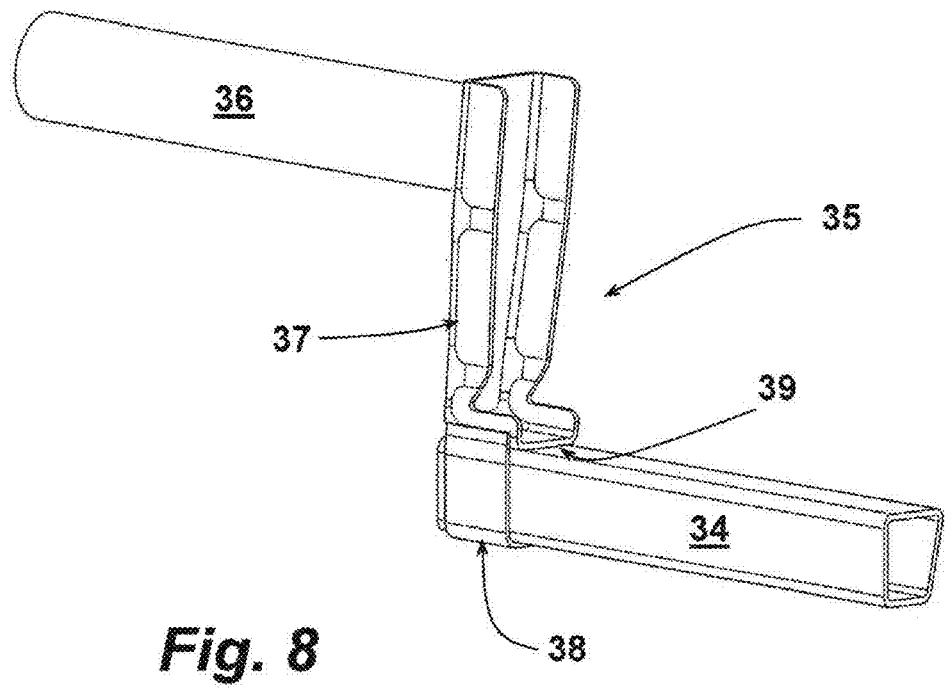
FIG. 8 shows still another embodiment of a metal connector for connecting two support parts of a support structure for an instrument panel support.

Still another embodiment of the support structure is shown in FIG. 8. In this embodiment, the support part 34 is made of a different material than the metal connector 35, which in turn is made of the same material as the second support part 36. The embodiment of FIG. 8 makes it clear that the metal connector 35 having its base part 37 and its bracket part 38 can also be designed to connect a support part 34 which has a cross-sectional geometry that differs from the round shape. In this embodiment, the support part connection surface 39 of the base part 37 is designed to be complementary to the side of the support part 34 facing towards this surface, namely straight. The U-shaped bracket part 38 is designed to correspond to the rest of the outline geometry of the support part 34. Like the base part 35 of the previous embodiments, the base part 37 is designed as a half-shell, wherein its open side is visible in the perspective of FIG. 8. Like the support part 29 of the embodiment shown in FIG. 5, the support part 36 is connected in a materially bonded manner to the base part 37 with its end face.

Figure 9:
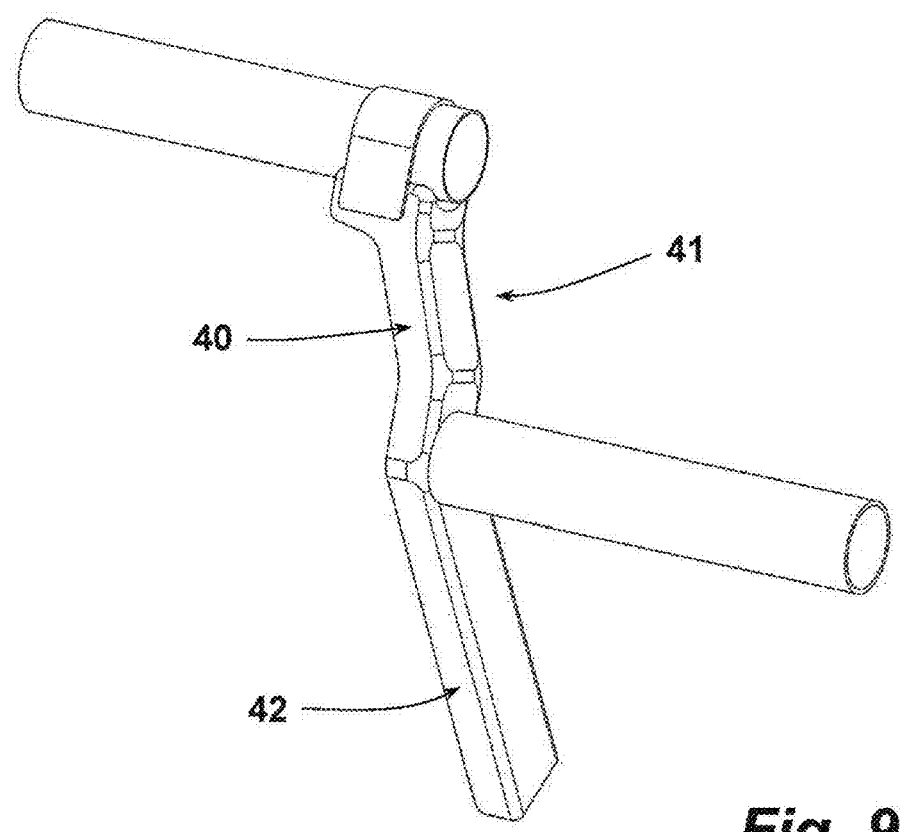
FIG. 9 shows still another embodiment of a metal connector for connecting two support parts for an instrument panel support.

FIG. 9 shows a refinement of the embodiment of FIG. 5. Therefore, the statements made regarding the embodiment of FIG. 5 apply similarly to the embodiment of FIG. 9. The embodiment of FIG. 9 differs from that of FIG. 5 in that the base part 40 of the metal connector 41 is part of a component of the support structure for an instrument panel support, which has an additional functionality. In this embodiment, the base part 40 is the upper section of a floor support 42, using which the support structure of the instrument panel support is fastened to the floor of a motor vehicle, for example on the tunnel.

FIG. 10 again shows a detail from a support structure for an instrument panel support of a motor vehicle. The metal connector 43 of the support structure is constructed in two shells. The metal connector 43 connects the two support parts 44, 45, wherein the support part 45 is made of the same material as the metal connector 43 and the support part 44 is made of a different material. The two shells of the metal connector 43 are identified in FIG. 10 by the reference numerals 46, 46.1. The connector shell 46 is described hereinafter. The same explanations also apply to the connector shell 46.1, which is arranged mirror-symmetrically to the joining plane to the connector shell 46 (see FIG. 11). The connector shell 46 is a component formed from a steel plate. The open side of the connector shell 46 faces away from the connector shell 46.1. The connector shell 46 is shaped to provide an approximately U-shaped support part connection surface 47. The support part connection surface 47 transitions into bracket part connection surfaces 48, 49 which are angled in relation thereto. The bracket part connection surfaces 48, 49 therefore face in the same direction as the support part connection surface 47. Before the two connector shells 46, 46.1 are joined, a small gap is left between the bracket part connection surfaces 48, 49 shown abutting in FIG. 11, which is closed by the welding process. In this way, a special compression of the connector shells 46, 46.1 on the lateral surface of the support part 44 is achieved. In this embodiment, it is provided that measures are taken in order to nevertheless leave an adhesive gap. In the embodiment shown, an adhesive is used which contains glass beads having a diameter which corresponds to the dimension of the adhesive gap provided.

Figure 10:
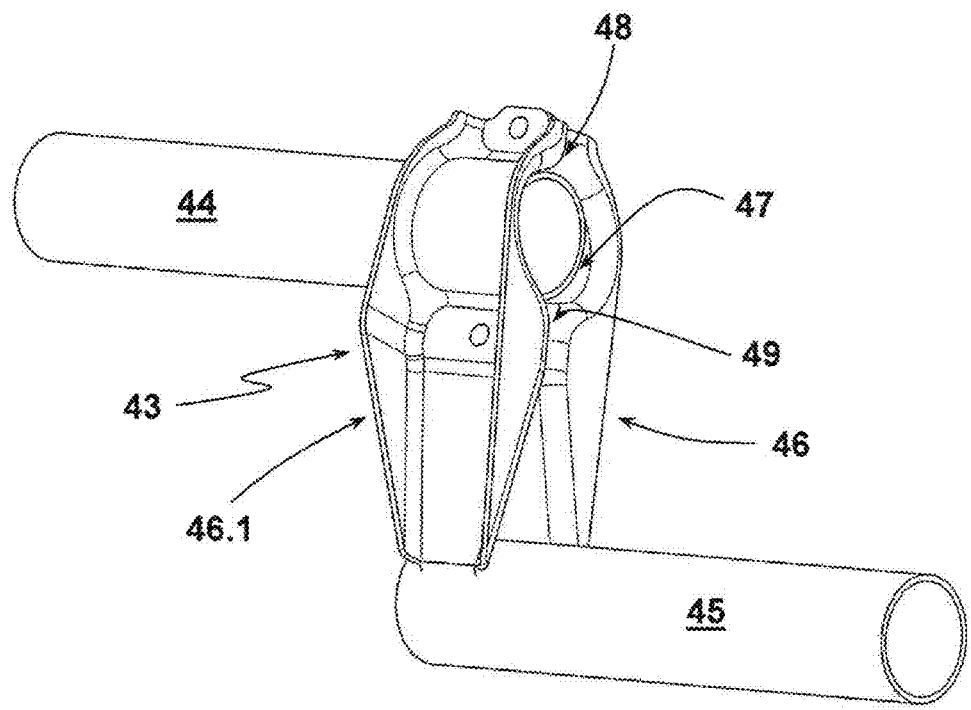
FIG. 10 shows still another embodiment of a metal connector for connecting two support parts of a support structure for an instrument panel support.
Figure 11:
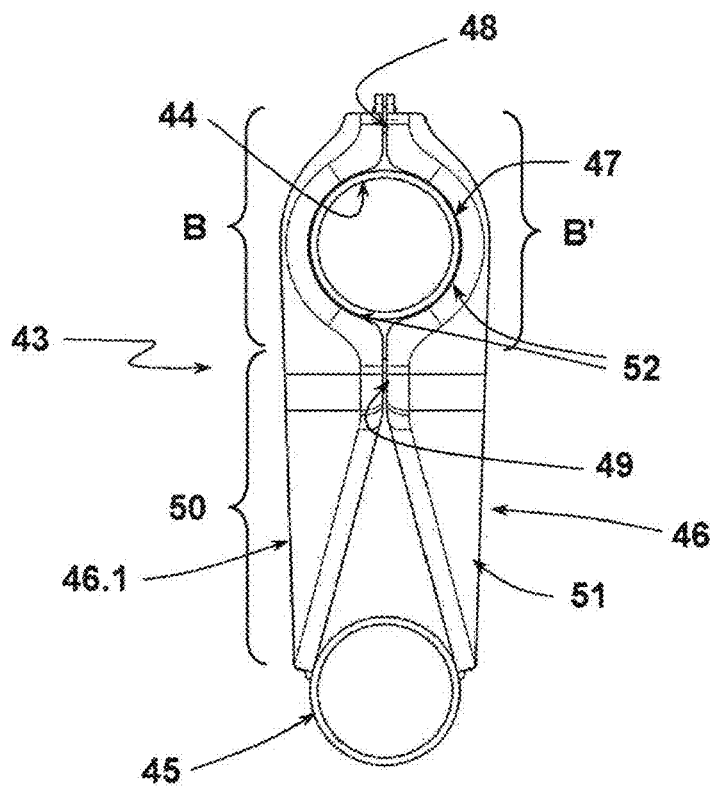
FIG. 11 shows a side view of the arrangement of FIG. 10.

The bracket part B in this metal connector 43 is provided by the upper section of the connector shell 46.1 in FIG. 10. This completes the support part enclosure, as shown in the side view of FIG. 11. The connector shell 46.1 also has, in addition to its upper section which represents the bracket part B to the support part connection surface 47 of the connector shell 46, a base part section 50 formed thereon that together with the base part section 51 of the connector shell 46 forms the base part of the metal connector 43. The metal connector 43 is designed as forked with respect to its base part sections 50, 51 so that, as in the embodiment of FIG. 1, the legs created in this way can be welded to the lateral surface of the support part 45.

The statements regarding the carrier shell 46 having its support part connection surface 47 apply similarly to the shell 46.1, so that the section having the support part connection surface 47 then represents the bracket part B' for the relevant section of the connector shell 46.1.

As in the other embodiments, the support part 44 is adhesively bonded to the support part connection surface 47 and the inside of the bracket part B, B'. The adhesive layer is identified by reference numeral 52 in FIG. 11.

Figure 12:
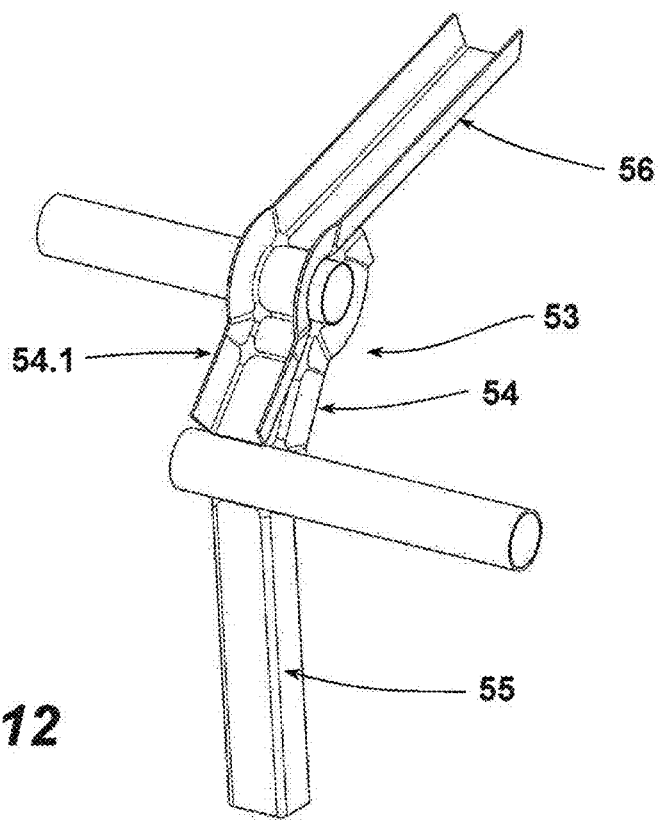
FIG. 12 shows another support structure for an instrument panel support of a motor vehicle.
Figure 13:
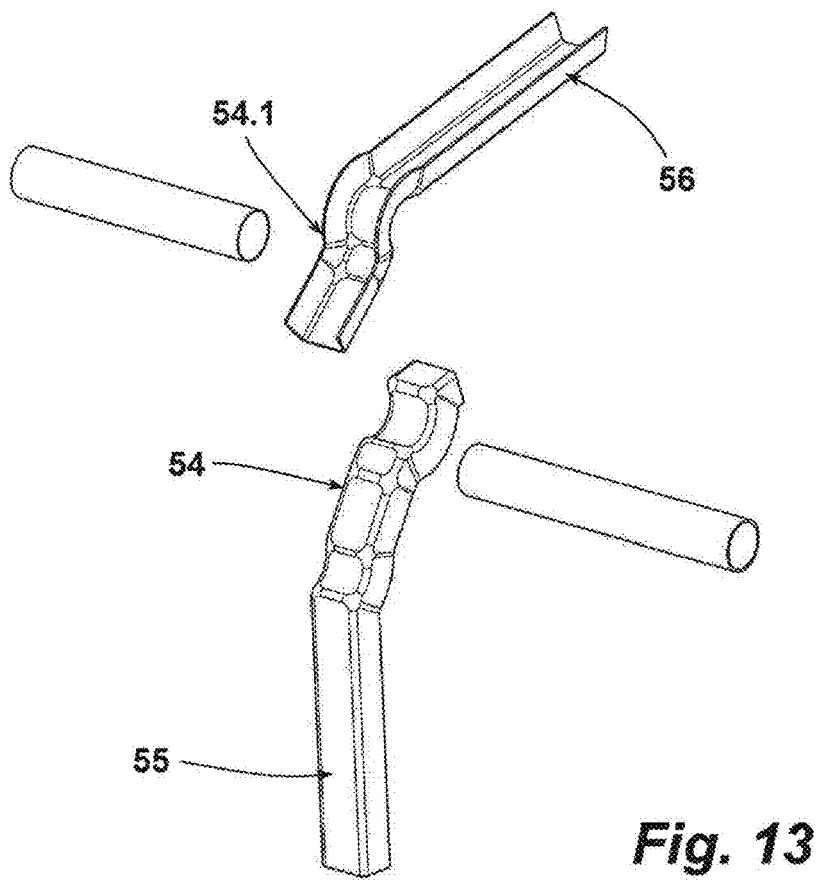
FIG. 13 shows the support structure of FIG. 12 in an exploded view.

FIGS. 12 and 13 show a refinement of a metal connector 53 formed from two half-shells 54, 54.1. The metal connector 53 is constructed like the metal connector 43 described for FIGS. 10 and 11. Each of the two connector shells 54, 54.1 of the metal connector 53 is part of a component having further component parts. Thus, the connector shell 54 is part of a floor support 55, while the connector shell 54.1 is part of a bracket 56.

Figure 14:
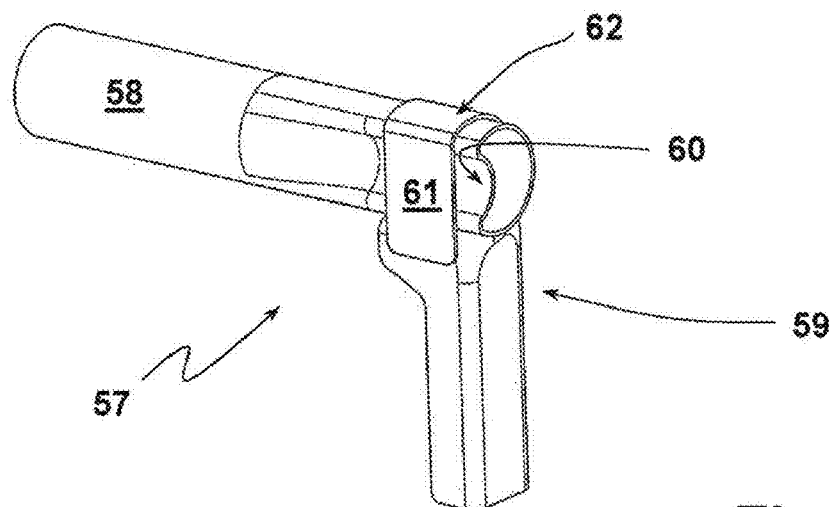
FIG. 14 shows a detail of a support structure having a support part and a metal connector connected thereto according to a further embodiment.

FIG. 14 shows another support structure 57 in detail. The end section of a support part 58 is shown, to which a metal connector 59 is connected. The metal connector 59 is constructed in principle like that described for FIG. 5, so that the relevant statements apply similarly to the metal connector 59. In the case of the support structure 57, the support part 58 is deformed with its end section engaging in the support part enclosure in order to provide a twist lock between the two parts during the curing of the adhesive. An indentation 60 is introduced into the lateral surface of this section of the support part 58 so that the leg 61 of the bracket part 62 located on this side contacts the support part 58 at two points spaced apart in the direction of the longitudinal extension of the leg 61. These are the marginal limits of the indentation 60. The space created by the indentation 60 can also be used, for example, as a cable feedthrough.

Figure 15:
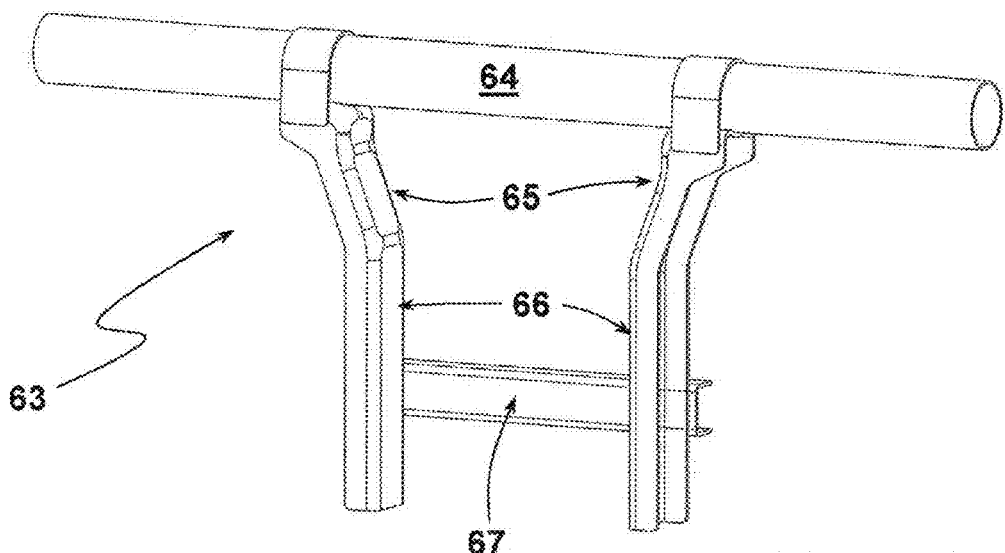
FIG. 15 shows a further support structure according to the disclosure.

FIG. 15 shows a further support structure 63. The support structure 63 comprises a continuous support part 64. In the embodiment shown, two metal connectors 65 are connected thereto at a distance from one another in the longitudinal extension of the support part 64. As in the embodiment of FIGS. 12 and 13, the metal connectors 65 are part of a structure, specifically supports 66 for providing a tunnel support in the embodiment shown in FIG. 15. The two supports 66 are connected to one another by a cross strut 67. The metal connectors 65 correspond, with respect to their section for the connection thereof to the support part 64, to the metal connector 26 of the embodiment shown in FIG. 5. The relevant statements therefore also apply to the support structure 65.

A design as shown in principle for the embodiment in FIG. 15 can also be used to connect two support parts to one another, for example because these support parts are made of different materials and are arranged aligned with one another. In such a case, the two metal connectors are always connected to one another by a cross strut. In such a design, the cross strut can be part of the two metal connectors. It is also conceivable that with such a design a holder or support is connected to a double metal connector conceived in this way.

Figure 16:
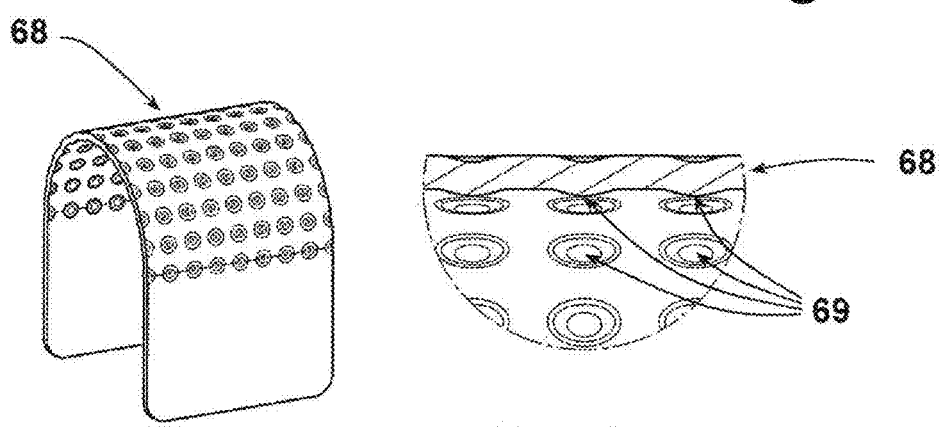
FIG. 16 shows a bracket part for a metal connector having embossings that preserve the adhesive gap.

In the embodiments shown in the figures, although this is not shown in detail, care is taken to ensure that a sufficient adhesive gap remains between the lateral surface of the section of the respective support part that engages in the support part enclosure. This can be achieved, for example, by the adhesive containing glass beads having a diameter of the gap width. These ensure that the adhesive gap is maintained so that it remains constant during curing and the desired tension, induced by the joint bond between the bracket part and the base part produced by the supply of heat, is achieved. Additionally or also alternatively to such a measure, bracket parts can be used which have multiple embossings directed in the direction of the lateral surface of the respective support part. Such a bracket part 68 is shown by way of example in FIG. 16, namely in a perspective view and an enlarged detail of a section in the area of the apex. In the case of the bracket part 68, the embossings are provided by quasi-punctiform pressing in of the outside of the bracket part 68, so that small protruding spacer knobs 69 arise on the inside of the bracket part 68, as is clear from the detail view. The extent to which these protrude from the inside of the bracket part corresponds to the gap dimension. If a galvanic isolation is provided between the metal connector and the support part, an adhesive having electrically non-conductive particles having a diameter corresponding to the gap dimension, such as glass beads, is preferable.

The invention has been described on the basis of numerous exemplary embodiments. The relevant design options for implementing the teaching of the claims are not restrictive. Without departing the scope of the claims, numerous further design options result for a person skilled in the art, without having to describe or show them in greater detail in the context of this disclosure.

| List of reference numerals | |
|---|---|
| 1 | support structure |
| 2 | support part |
| 3 | support part |
| 4 | metal connector |
| 5 | base part |
| 6 | bracket part |
| 7 | support part connection surface |
| 8 | leg |
| 9 | closing plate |
| 10 | leg |
| 11 | leg |
| 12 | leg |
| 13 | adhesive layer |
| 14 | support part |
| 15 | metal connector |
| 16 | end face |
| 17 | opening |
| 18 | tab, end face stop |
| 19 | closing plate |
| 20 | metal connector |
| 21 | support part |
| 22 | support part |
| 23 | bracket part |
| 24 | base part |
| 25 | base part |
| 26 | metal connector |
| 27 | bracket part |
| 28 | support part |
| 29 | support part |
| 30 | support part |
| 31 | bracket part leg opening |
| 32 | leg |
| 33 | bracket part |

| List of reference numerals (continued) | |
|---|---|
| 34 | support part |
| 35 | metal connector |
| 36 | support part |
| 37 | base part |
| 38 | bracket part |
| 39 | support part connection surface |
| 40 | base part |
| 41 | metal connector |
| 42 | floor support |
| 43 | metal connector |
| 44 | support part |
| 45 | support part |
| 46, 46.1 | connector shell |
| 47 | support part connection surface |
| 48 | bracket part connection surface |
| 49 | bracket part connection surface |
| 50 | base part section |
| 51 | base part section |
| 52 | adhesive layer |
| 53 | metal connector |
| 54, 54.1 | connector shell |
| 55 | floor support |
| 56 | bracket |
| 57 | support structure |
| 58 | support part |
| 59 | metal connector |
| 60 | indentation |
| 61 | leg |
| 62 | bracket part |
| 63 | support structure |
| 64 | support part |
| 65 | metal connector |
| 66 | support |
| 67 | cross strut |
| 68 | bracket part |
| 69 | spacer nub |
| B, B' | bracket part |

The invention claimed is:

1. An instrument panel support for a motor vehicle, comprising:
a support structure having at least one support part following a longitudinal extension of the instrument panel support and having at least one metal connector for connecting a first support part to another support part or for connecting a strut or bracket to the first support part, wherein the first support part is made of different material than the metal connector, and
wherein the metal connector is constructed in several parts and comprises a base part and a bracket part, with the base part having a support part connection surface supported on a lateral surface of the first support part, and the bracket part enclosing the first support part opposite to the support part connection surface to provide a support part connection together with the support part connection surface of the base part, and
wherein the metal connector is connected to the first support part by an adhesive bond in an area of the support part enclosure, and the bracket part is connected to the base part as a result of a joining process carried out with heat.

2. The instrument panel support of claim 1, wherein the support part connection surface of the base part is adapted to a contour of the lateral surface of the first support part in a section thereof engaging in the support part enclosure.

3. The instrument panel support of claim 2, wherein the section of the support part engaging in the support part enclosure has a cylindrical lateral surface, and the support part connection surface is curved at a larger radius than the cylindrical lateral surface, such that an adhesive gap is provided between the lateral surface of the first support part and the support part connection surface of the base part.

4. The instrument panel support of claim 2, wherein the bracket part and/or the support part has one or more projecting embossings on a side thereof facing toward each other, and/or the adhesive bond is formed with an adhesive that contains spherical or globular solid particles, such that an adhesive gap is provided between the metal connector and the first support part.

5. The instrument panel support of claim 1, wherein the bracket part has a hat-shaped side profile with legs pointing away from the first support part, and the legs are connected in a materially bonded manner to bracket connection surfaces of the base part located adjacent to the support part connection surface of the base part.

6. The instrument panel support of claim 5, wherein the metal connector is composed of two shells with opening sides thereof facing away from one another in a transverse direction to the longitudinal extension of the first support part.

7. The instrument panel support of claim 1, wherein the bracket part is U-shaped with two legs, and the two legs of the bracket part are connected on opposite side surfaces of the base part facing in a transverse direction to the longitudinal extension of the first support part.

8. The instrument panel support of claim 7, wherein the bracket part is engaged in a formfitting manner with the first support part in the direction of the longitudinal extension of the first support part.

9. The instrument panel support of claim 8, wherein the bracket part engages with at least one of the two legs thereof in a bracket part leg opening introduced tangentially in the lateral surface of the first support part.

10. The instrument panel support of claim 8, wherein the first support part has at least one leg passage through which a leg of the bracket part is guided.

11. The instrument panel support of claim 1, wherein the base part is a stamped and bent part.

12. The instrument panel support of claim 1, wherein the base part is a section of an extruded profile.

13. The instrument panel support of claim 1, wherein the base part has an end face stop for a section of the first support part engaging in the support part enclosure.

14. The instrument panel support of claim 1, wherein the support structure has a second support part following the longitudinal extension of the instrument panel support, and wherein the first and second support parts are connected to one another by the metal connector, which is connected to both of the two support parts, and are offset to one another in a transverse direction to the longitudinal extension of the instrument support panel at least in sections thereof connected by the metal connector.

15. The instrument panel support of claim 14, wherein the metal connector is made of a different material than the two support parts connected thereto, and the metal connector is connected to the second support part by an adhesive bond in a same manner as the first support part.

16. The instrument panel support of claim 14, wherein the metal connector is made of a same material as the second support part and connected thereto in a materially bonded manner by a joining process.

17. The instrument panel support of claim 16, wherein the metal connector is designed as forked with two legs at least in an area thereof connected to the second support part, such that the two legs forming a fork abut on an outer lateral surface of the second support part.

18. The instrument panel support of claim 17, wherein the fork for accommodating the second support part is tapered from a mouth of the fork in the direction toward the base part.

19. The instrument panel support of claim 1, wherein the base part and/or the bracket part are part of components of the instrument panel support used for another purpose other than the connection of two support parts.

20. The instrument panel support of claim 1, wherein the at least one support part is designed as a tube.

* * * * *